Feb. 25, 1930.　　J. B. STRAUSS　　1,748,563

YIELDING BARRIER FOR VEHICLES

Filed Dec. 17, 1925　　3 Sheets-Sheet 1

Inventor
Joseph B. Strauss
By Parker & Carter Attys.

Feb. 25, 1930. J. B. STRAUSS 1,748,563
YIELDING BARRIER FOR VEHICLES
Filed Dec. 17, 1926 3 Sheets-Sheet 2
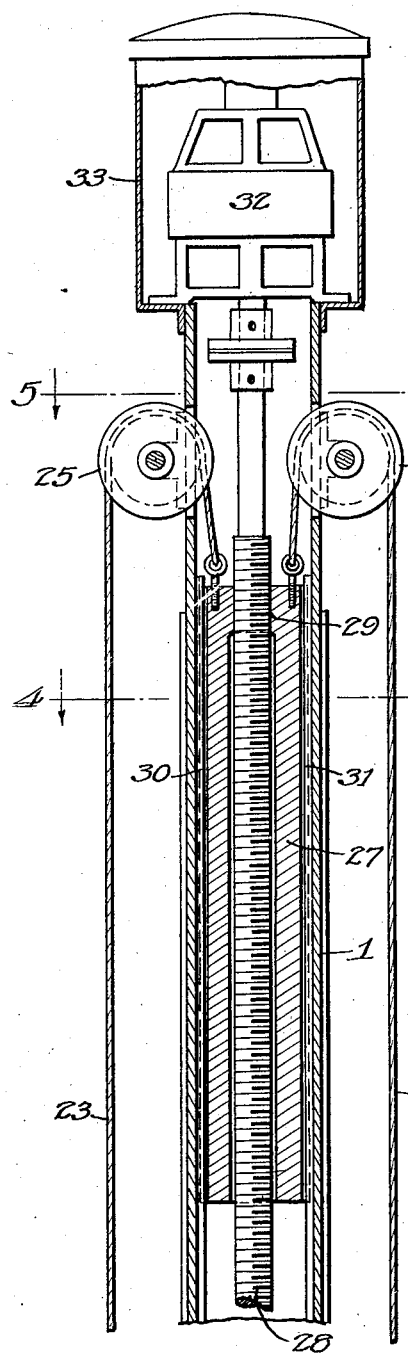
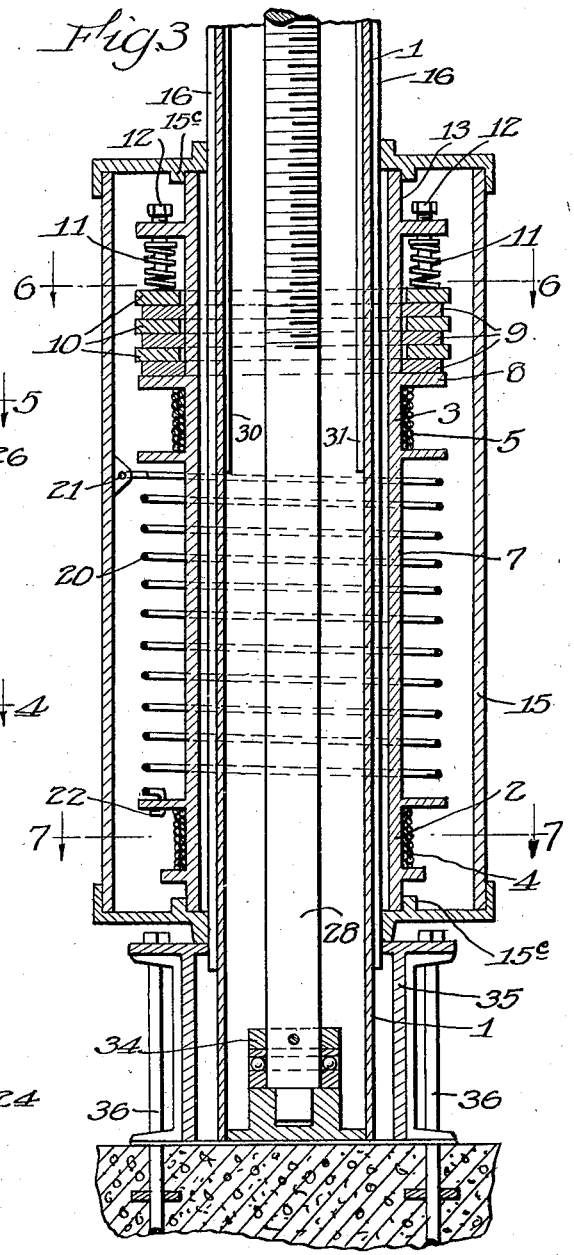

Feb. 25, 1930.  J. B. STRAUSS  1,748,563
YIELDING BARRIER FOR VEHICLES
Filed Dec. 17, 1926  3 Sheets-Sheet 3

Inventor:
Joseph B. Strauss
By Parker & Carter Attys.

Patented Feb. 25, 1930

1,748,563

UNITED STATES PATENT OFFICE

JOSEPH B. STRAUSS, OF CHICAGO, ILLINOIS

YIELDING BARRIER FOR VEHICLES

Application filed December 17, 1926. Serial No. 155,864.

This invention relates to yielding barriers for vehicles and has for its object to provide a new and improved device of this description, particularly adapted to gradually bring automobiles to a stop at railway, street car and other crossings.

The invention has as a further object to provide a barrier for vehicles with a flexible obstructing part extending across the roadway with a pay out cable at each side of the roadway, connected therewith, and means for lifting and lowering the obstructing device and controlling the pay out cables therefor.

The invention has as a further object to provide a yielding barrier where the cables connected with the flexible part which extends across the space to be protected, are arranged on drums which surround the support along which the drums move when the barrier is lifted and lowered.

The invention has further objects which are more particularly pointed out in the accompanying description.

Referring now to the drawings:

Fig. 2 is an enlarged sectional view through the top of one of the supports.

Fig. 3 is a sectional view through the bottom of one of the supports.

Like numerals refer to like parts throughout the several figures.

Figure 1:
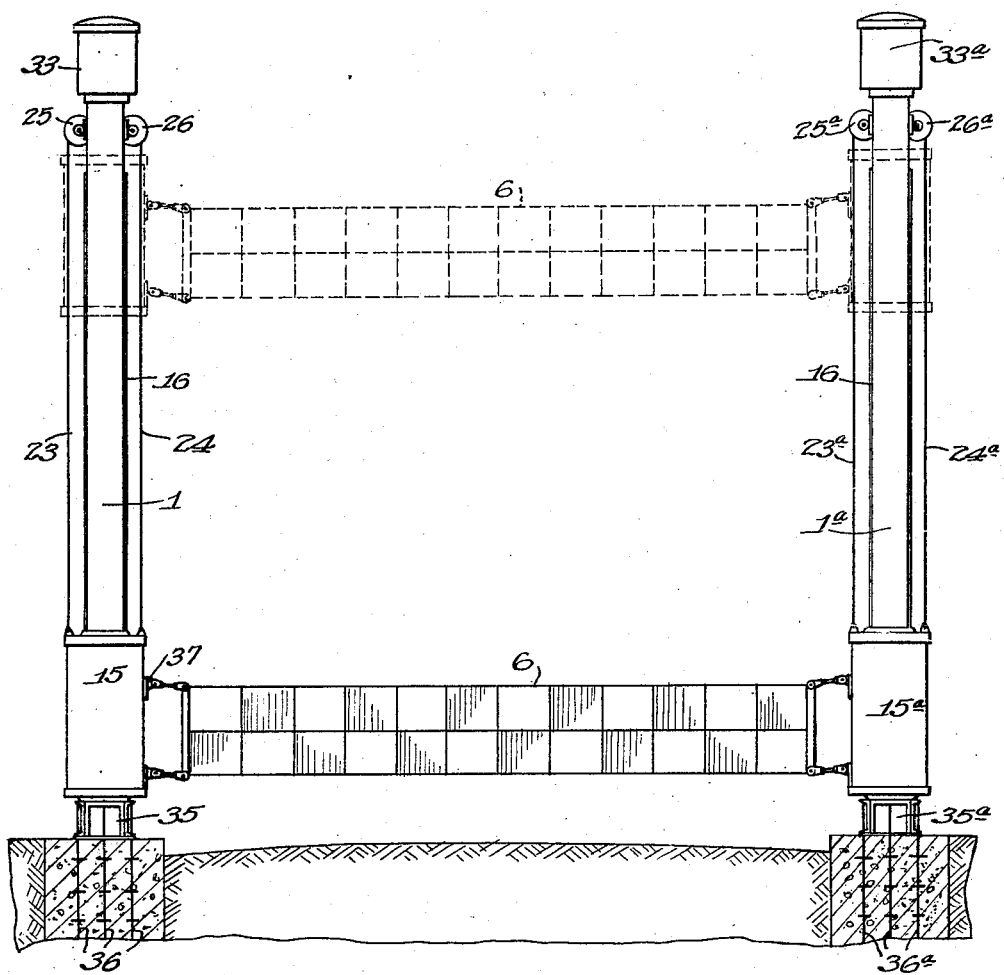
Fig. 1 is a view showing one form of barrier embodying the invention.
Figure 4:
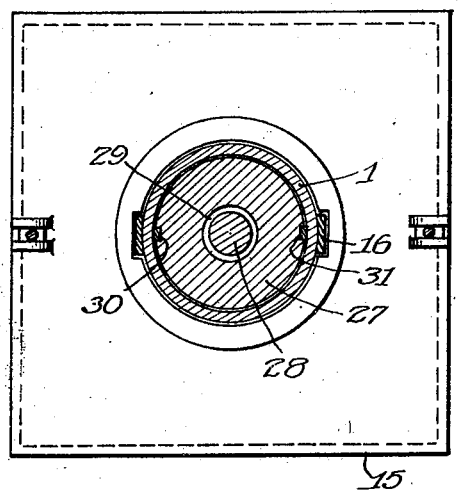
Fig. 4 is a sectional view taken on line 4—4 of Fig. 2.
Figure 5:
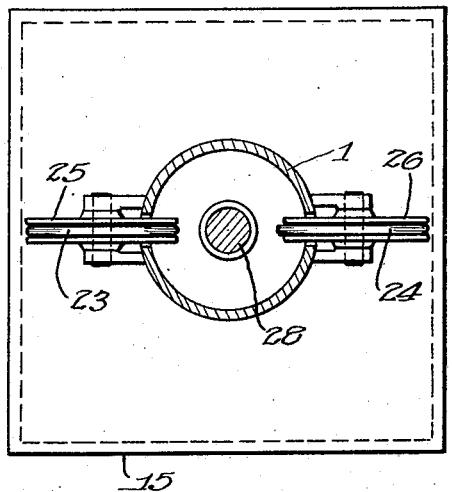
Fig. 5 is a sectional view taken on line 5—5 of Fig. 2.
Figure 6:
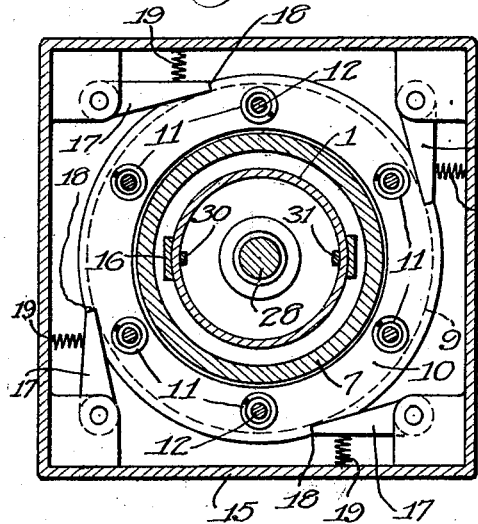
Fig. 6 is a sectional view taken on line 6—6 of Fig. 3.

Referring now to the drawings:

I have shown in Fig. 1 one form of device embodying the invention, wherein there are supports 1, 1ª on opposite sides of the roadway. These supports are hollow and are preferably made of iron pipe. Slidably mounted upon each support are drums 2 and 3 provided with pay out cables 4 and 5 which are connected with a flexible, obstructing device 6 extending across the space to be protected. The mechanism on the opposite sides of the roadway is similar. Some means is provided for retarding the paying out of the cables connected with the obstructing device 6.

For this purpose, I use a brake mechanism of some suitable description. In the construction shown, the brake consists of friction plates arranged to retard the paying out of the cables but to permit the rewinding of the cables on the drums without retardation. The drums 2 and 3 are preferably connected together and I have shown them as connected together by a section 7, integral with the drums. This section is provided with a flange 8 upon which are mounted the friction plates. There are two sets of plates, the plates 9 forming one set and the plates 10, the other set. The plates are pressed together so as to secure frictional contact by any desired means, such as the springs 11 adapted to be adjusted by the adjusting screws 12. Plates 9 are arranged to rotate with the drums. The plates 10 are arranged to be held against rotation. In the construction shown the drums are provided with the extension 13 surrounded by the friction plates, the plates 9 being attached thereto by keys or other means. The friction plates 10 are apparent from the extension 13 and extend beyond the friction plates 9 as shown in Fig. 3. The drums and friction plates are enclosed in the casing 15 which is rotatably mounted with the support but is free to slide therealong. For this purpose, the supports are provided with guides 16 which work in guideways in the ends of the casing. Pivotally connected with the casing are the pawls 17. The friction plates 10 are provided with engaging parts or shoulders 18 which engage these pawls 17 when the drum is rotated to pay out the cables, thereby holding the friction plates 10 against movement. The friction plates 9 being connected with the drums, rotate and the frictional resistance between the two sets of plates retards the paying out of the cables.

The pawls 17 are pressed toward the friction plates by the springs 19. It will, therefore, be seen that when the drums are rotated in the opposite direction to rewind the cables thereon, the friction plates 10 will be released by the pawls and will rotate with the friction plates 9, due to the frictional contact between the two sets of plates. The retarding effect is, therefore, removed when the cables are rewound on the drums. Some suitable means for rewinding these cables is provided.

In the construction shown, this means consists of a spring 20 which has one end connected at 21, with the casing 15 and the other end connected at 22 with the drums. In the construction shown, I have illustrated a single, integral cylinder surrounding the support and which carries the drums and the brake cables and brake mechanism. This cylinder rotates about the support in bearings at the ends of the casing 15, such bearings being shown as annular projections 15$^c$. The parts are arranged to permit the free rotation of the drums without engaging the guides on the support.

Some means is provided for raising the obstructing device 6 so that it will be out of the way when there is no danger to the traffic and for lowering it into its operative position when it is desired to protect the traffic. This result is secured by moving the drums and casings 15 along the supports 1 and 1$^a$. For this purpose, flexible devices 23, 24, and 23$^a$, 24$^a$, are connected to the casings or enclosed devices 15 and 15$^a$. As shown in Fig. 1, these flexible devices pass over direction changing devices, 25, 26, 25$^a$ and 26$^a$ near the top of the supports and are then connected with counter weights inside the supports. Fig. 2 shows them connected with the counter weight 27. Located within the supports are rotatable shafts having an operative connection with the counter weights so as to raise and lower said counter weights when the shafts are rotated.

One of these shafts 28, is shown in Fig. 2 and is provided with screw threads which engage a screw threaded portion 29 of the counter weight. The counter weight is shown as surrounding the shaft 28 and is provided with means for preventing its rotation but is permitted to slide up and down in the support 1. For this purpose, there are guides 30, 31 on the inner face of the support 1 and guideways in the counter weight into which these guides are received. Nuts may be employed instead of the counter weight, if desired. The shafts inside the supports are rotated in any desired manner, preferably by motors on the top of the supports. In Fig. 2, one of these motors 32 is shown. The motors are enclosed in the housings 33, 33$^a$. Each of the shafts in the supports is mounted in a suitable bearing at the bottom of the support.

Figure 7:
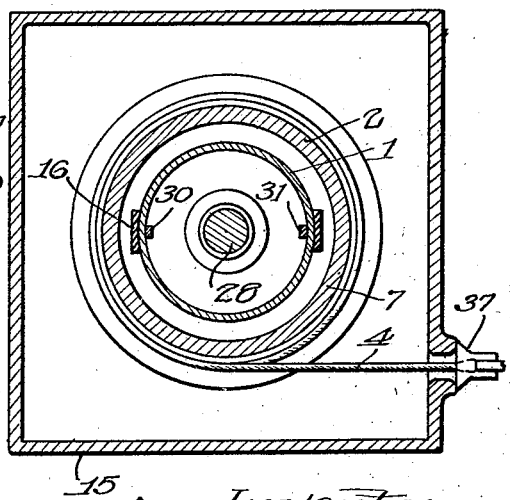
Fig. 7 is a sectional view taken on line 7—7 of Fig. 3.

Fig. 3 shows the shaft 28 of one of these supports mounted in the bearing 34. The supports are provided with bases 35, 35$^a$ and are anchored to the foundation. As herein shown these bases are anchored to a concrete foundation by the anchoring members 36, 36$^a$. The bases of the supports also act as stops or limiting devices for the casings 15. The cables on the drums are provided with stops 37, (see Fig. 7) which engage the casing 15 so as to stop the winding up of the cables when the obstructing device is moved to its proper position.

I have described in detail, a particular construction embodying the invention but it is, of course, evident that the parts may be changed in many particulars without departing from the spirit of the invention as embodied in the claims hereto appended.

The use and operation of my invention are as follows:—

When the roadway is open and there is no need of protecting the traffic therealong, the obstructing device 6 is raised a sufficient distance above the roadway so as not to interfere with the traffic as shown in dotted lines in Fig. 1. When it is desired to use the obstructing device, as, for example, to protect the traffic from passing trains, electric cars or the like, the motors at the top of the supports are set in operation. This causes the shafts in the supports 1 and 1$^a$ to rotate and the threaded connection between said shafts and the counter weights cause said counter weights to be moved toward the top of the supports and the obstructing device 6 to be lowered to its operative position, as shown in full lines in Fig. 1.

If, now, a vehicle, such as an automobile coming along the roadway, fails to stop, it will strike the obstructing device 6, and the force of the impact will cause the obstructing device 6 to move forward with the automobile and this causes the drum on the supports to rotate so as to pay out the cables and permit the automobile to move forward. The friction plates 10 are held against rotation by the pawls 17 and the friction plates 9 rotate with the drums thus providing a frictional resistance which retards the paying out of the cables, and causes the automobile to be gradually stopped. The desired friction between the plates is secured by properly adjusting the adjusting screw 12. When the device is used to protect against trains or cars, one device will be placed on each side of the track and at a sufficient distance therefrom to permit the obstructing device 6 to be moved forward the desired amount without reaching the track. When the pressure of the automobile is relieved from the obstructing device, the retracting devices, that is, the coil springs in the casings, which have been wound up by the rotation of the drums, now rotate the drums in the opposite direction so as to rewind the cables thereon. The motors at the top of the supports are then set in operation and the obstructing devices again moved up out of the way.

I claim:

1. A yielding barrier for vehicles comprising supports on opposite sides of the roadway, an obstructing device extending between said supports, rotatable drums surrounding said supports, cables on said drums connected with said obstructing device, means for retarding the paying out of said cables when the obstructing device is struck by a vehicle, and means for sliding said drums along the exterior of said supports to move the obstructing device to its operative and inoperative positions.

2. A yielding barrier for vehicles comprising supports on opposite sides of the roadway, an obstructing device extending between said supports, rotatable drums surrounding said supports, cables on said drums connected with said obstructing device, means for retarding the paying out of said cables when the obstructing device is struck by a vehicle, means for sliding said drums along the exterior of said supports to move the obstructing device to its operative and inoperative positions, and casings on the outside of said supports enclosing said drums, said casings having a sliding nonrotating connection with said supports.

3. A yielding barrier for vehicles comprising supports on opposite sides of the roadway, an obstructing device extending between said supports, drums rotatably mounted on the exterior of said supports, cables on said drums connected with said obstructing device, means for retarding the paying out of said cables when the obstructing device is struck by a vehicle, casings surrounding said drums and slidably connected with the exterior of said supports, flexible devices connected with said casings, direction changing devices connected with the supports over which the flexible devices pass, reciprocating devices in said supports with which said flexible devices are connected, and shafts in said supports operatively connected with said reciprocating devices so as to move them along said supports when the shafts are rotated and means for rotating said shafts.

4. A yielding barrier for vehicles comprising hollow supports on each side of the roadway, an obstructing device spanning the space between said supports, rotatable drums on the exterior of said supports, cables on said drums connected with said obstructing device, retarding devices associated with said drums, each retarding device comprising two sets of friction plates, one set connected with the drums so as to rotate therewith, the other set connected with a non-rotating part so as to be held against rotation when the drums are rotated to pay out the cables.

5. A yielding barrier for vehicles comprising supports on opposite sides of the roadway, an obstructing device located between said supports, rotatable drums surrounding said supports, cables on said drums connected with said obstructing device, casings surrounding said drums and having sliding non-rotating connections with said supports.

6. A yielding barrier for vehicles comprising supports on opposite sides of the roadway, an obstructing device located between said supports, rotatable drums surrounding said supports, cables on said drums connected with said obstructing device, casings surrounding said drums, having sliding, nonrotating connections with said supports, retarding devices for said drums located on the exterior of said supports and having portions connected with the drums and with the casings.

7. A yielding barrier for vehicles comprising supports on opposite sides of the roadway, an obstructing device located between said supports, rotatable drums surrounding said supports, cables on said drums connected with said obstructing device, casings surrounding said drums, having sliding, non-rotating connections with said supports, retarding devices for said drums located on the exterior of said supports and having portions connected with the drums and with the casings, shafts located in said supports and extending longitudinally therealong, and operative connections between said shafts and said casings whereby the casings and drums may be raised and lowered by rotating said shafts.

8. A yielding barrier for vehicles comprising supports on opposite sides of the roadway, shafts inside of said supports and extending longitudinally therealong, rotatable drums outside of said supports and movable longitudinally therealong, operative connections between said shafts and said drums for moving the drums longitudinally along said supports, cables on said drums and an obstructing device extending across the roadway with which said cables are connected.

9. A yielding barrier for vehicles comprising supports on opposite sides of the roadway, shafts inside of said supports and extending longitudinally therealong, rotatable drums outside of said supports and movable longitudinally therealong, operative connections between said shafts and said drums for moving the drums longitudinally along said supports, means for connecting cables on said drums, an obstructing device extending across the roadway with which said cables are connected, non-rotating casings surrounding said drums, friction plates within the casings and surrounding said supports, some of said friction plates associated with each support with their associated casing and means for connecting other of said friction plates with their associated drum.

10. A yielding barrier for vehicles comprising supports on opposite sides of the roadway, an obstructing device between said supports, cables connected with said obstructing device, a rotatable cylinder surrounding each support, two drums forming a part of said cylinder upon which said cables are wound, friction plates surrounding said cylinder, means for connecting some of said plates with said cylinder, a non-rotating part, means for releasably connecting some of said plates with said non-rotatable part and a retracting device surrounding said cylinder for returning the drums to their initial positions.

11. A yielding barrier for vehicles comprising supports at opposite sides of the roadway, each of said supports provided with a cylinder exterior thereto, a casing surrounding said cylinder, the cylinder being rotatably mounted in said casing, a shaft on the interior of the support extending longitudinally therein, an operative connection between the shaft and the casing for raising and lowering the casing and cylinder, a cable on said cylinder, an obstructing device for the vehicles with which said cable is connected, and means for resisting the rotation of said cylinder when the obstructing device is struck by the vehicle.

12. A yielding barrier for vehicles comprising supports on opposite sides of the roadways, an obstructing device extending between said supports, a drum associated with each of said supports, cables connected by said drums and connected with said obstructing device, a series of friction plates associated with each drum and means for causing adjacent friction plates to move relatively when the obstructing device is moved so as to retard the movement of said obstructing device.

13. A yielding barrier for vehicles comprising supports on opposite sides of the roadways, an obstructing device extending between said supports, a drum associated with each of said supports, cables connected by said drums and connected with said obstructing device, a series of friction plates associated with each drum, means for causing adjacent friction plates to move relatively when the obstructing device is moved so as to retard the movement of said obstructing device, and means for permitting the said friction plates to move together when the cables are being rewound.

Signed at Chicago, county of Cook and State of Illinois, this 15th day of December, 1926.

JOSEPH B. STRAUSS.